Sept. 14, 1965 F. DE JONG 3,206,215
FERTILIZER SPREADER
Filed Feb. 27, 1964 5 Sheets-Sheet 1

INVENTOR.
FLOYD DE JONG,
BY
McMorrow, Berman & Davidson
ATTORNEYS.

Sept. 14, 1965

F. DE JONG 3,206,215

FERTILIZER SPREADER

Filed Feb. 27, 1964

INVENTOR.
FLOYD DE JONG,
BY
McMorrow, Berman & Davidson
ATTORNEYS.

Sept. 14, 1965  F. DE JONG  3,206,215

FERTILIZER SPREADER

Filed Feb. 27, 1964  5 Sheets-Sheet 3

INVENTOR.
FLOYD DE JONG,
BY
*Mc Mourn, Burman & Dondam*
ATTORNEYS.

INVENTOR.
FLOYD DE JONG,

Sept. 14, 1965    F. DE JONG    3,206,215
FERTILIZER SPREADER
Filed Feb. 27, 1964    5 Sheets-Sheet 5

INVENTOR
FLOYD DE JONG
BY Reynolds & Christensen
ATTORNEYS

United States Patent Office 3,206,215
Patented Sept. 14, 1965

3,206,215
FERTILIZER SPREADER
Floyd De Jong, deceased, late of Duvall, Wash., by Ina
Mae De Jong, administratrix, P.O. Box 121, Duvall,
Wash.
Filed Feb. 27, 1964, Ser. No. 363,035
19 Claims. (Cl. 275—4)

This application is a continuation-in-part of U.S. patent application Serial No. 297,927, filed on July 26, 1963, and now abandoned, entitled "Fertilizer Spreader" in the name of Floyd De Jong, inventor.

The present invention relates to fertilizer spreaders and more particularly to an improved type of versatile fertilizer spreader adapted for use not only with various types of manure and commercial fertilizers but also for use as a liquid spraying apparatus.

Various types of fertilizer spreaders are in common use at the present time and are generally adapted to spread one or the other of commercial fertilizers or manure, but generally not both types of material. Spreaders of the former type include the well known liquid fertilizer spraying machines which are provided with sets of spraying nozzles directed toward the ground and adapted to spray pressurized liquid fertilizer on a field as the spreader moves thereacross. Spreaders of the second mentioned type are generally particularly adapted for handling raw manure in solid or semi-solid form and hence are not suitable for use with the various types of commercially available fertilizer.

In the efficient operation of a farm it is frequently necessary to be able to utilize manure produced by farm animals as a fertilizer and also to be able to use commercially available fertilizers. This has in the past generally necessitated the purchase of two separate pieces of spreading equipment. In addition, it is freqently necessary or advantageous in the operation of a farm to be able to readily spray various liquids such as insecticides on an orchard or to transport liquid such as water from one place to another. The ability to perform each of these separate operations has in the past required a specialized piece of equipment for each separate task.

It is therefore an object of the present invention to provide an apparatus adapted for use with various types of fertilizers for efficiently spreading the same on a field.

It is a further object of the present invention to provide an improved fertilizer spreader which is also readily usable for transporting liquids and for spraying the same.

Another object of the present invention is to provide an improved fertilizer spreader which is self loading, is adapted for use with various types of fertilizers, and operates to spread the fertilizer over a very wide area on a single pass of the apparatus across a field.

An additional object of the present invention is the provision of a spreader wherein fertilizer is drawn into an intake chamber from a source thereof by mechanical means, transferred to a loading conveyor chamber, through selectively controlled gate means, the conveyor chamber being in communication with a hopper for loading the same, the conveyor in the conveyor chamber being reversible for removal of fertilizer from the hopper with the fertilizer being blown and spread onto a field behind the spreader, by means of a fan, the transfer of fertilizer from the loading conveyor to the discharge chamber and the amount of fertilizer being controlled by said gate means.

In accordance with the present invention a suitable hopper or fertilizer holding chamber is provided with an opening (or openings) for receiving and discharging the material to be spread. Conduit means in the form of one or more cylindrical steel tubes extends rearwardly from the hopper and communicates with the opening (or openings) in the rear wall of the hopper so that the fertilizer can be forced into and out from the hopper through the conduit means. In one embodiment of the invention shown for purpose of illustration separate intake and discharge conduits are provided with an auger or screw conveyor being disposed in the intake conduit and a fan or blower being provided in the discharge conduit. A separate auger or screw conveyor is provided in the hopper to assist in mixing the material and also to aid in the loading and discharge operations by being selectively rotated in one direction during loading and in the opposite direction during unloading. Adjustable closure gates are disposed across the openings for controlling the filling and discharge flows. In another embodiment a single conduit is provided with the fan or blower located therein being selectively driven in one direction for loading and in the opposite direction for unloading (simultaneously with the rotation of the screw conveyor inside the hopper).

The various fan blades and screw conveyors are well fitted in the conduits so that the apparatus works well for loading and unloading liquids such as water as well as materials such as manure. During the spreading operation it is found that the fan blades serve to blow the material over a very wide path and hence wide coverage is obtained by a single pass of the apparatus across a field. In addition, when the apparatus is used with a liquid such as an insecticide spray the fan will serve to create a spray of fine particles in the nature of a fog so that the apparatus can be used for spraying orchards. A controllable deflecting member is provided near the open end of the conduit means to prevent undesirable spraying of the material during loading operations and also may be used for aiding in the discharge of the material by partially directing the discharge.

Other important objects and advantageous features of the invention will be apparent from the following description and the accompanying drawings, wherein, for purposes of illustration only, specific forms of the invention are set forth in detail.

Figure 2:
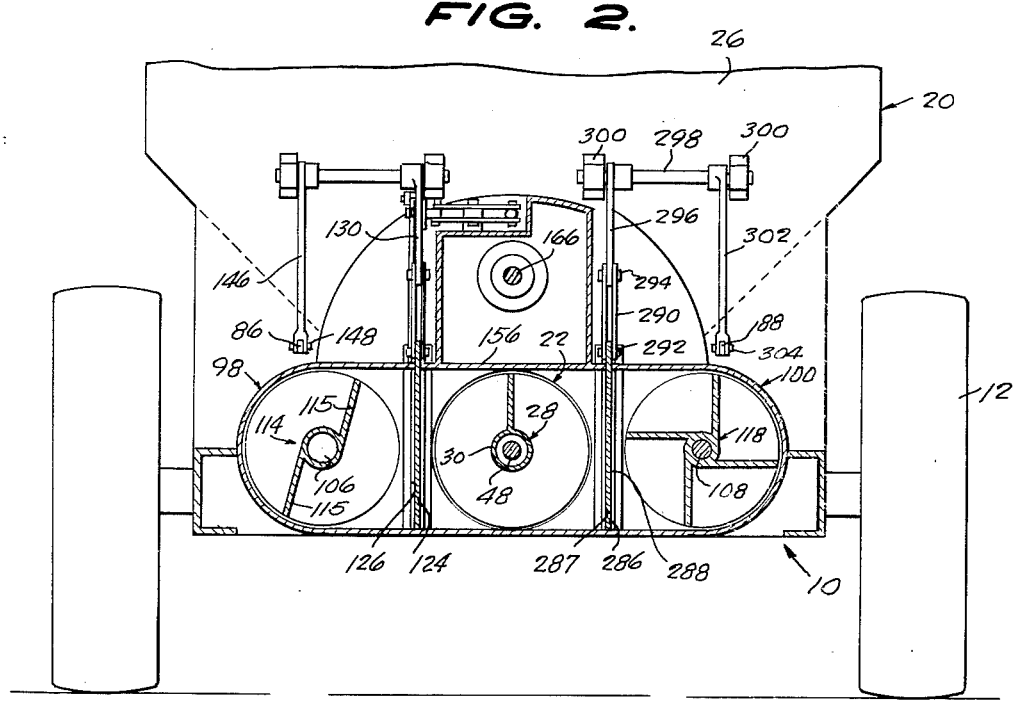
FIGURE 2 is an enlarged vertical transverse section taken on the line 2—2 of FIGURE 3.
Figure 1:
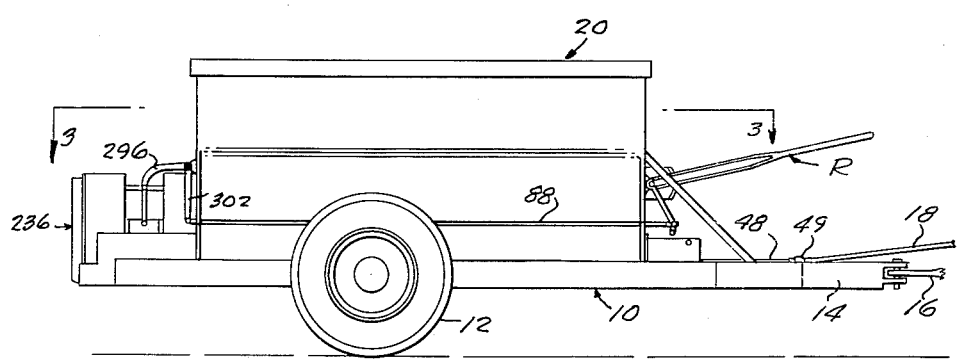
FIGURE 1 is a right-hand side elevation of a spreader in accordance with the present invention.

Referring in detail to the drawings, the illustrated fertilizer spreader comprises a frame 10, supported on a pair of laterally spaced wheels 12, located intermediate its ends, and having a drawbar 14, on its forward end, adapted to be connected to the drawbar 16, of a tractor (not shown) having a rearwardly extending power take-off shaft 18. A V-bottom hopper 20 is secured upon and occupies the major part of the length of the frame 10, and is centered between the sides thereof.

Figure 4:
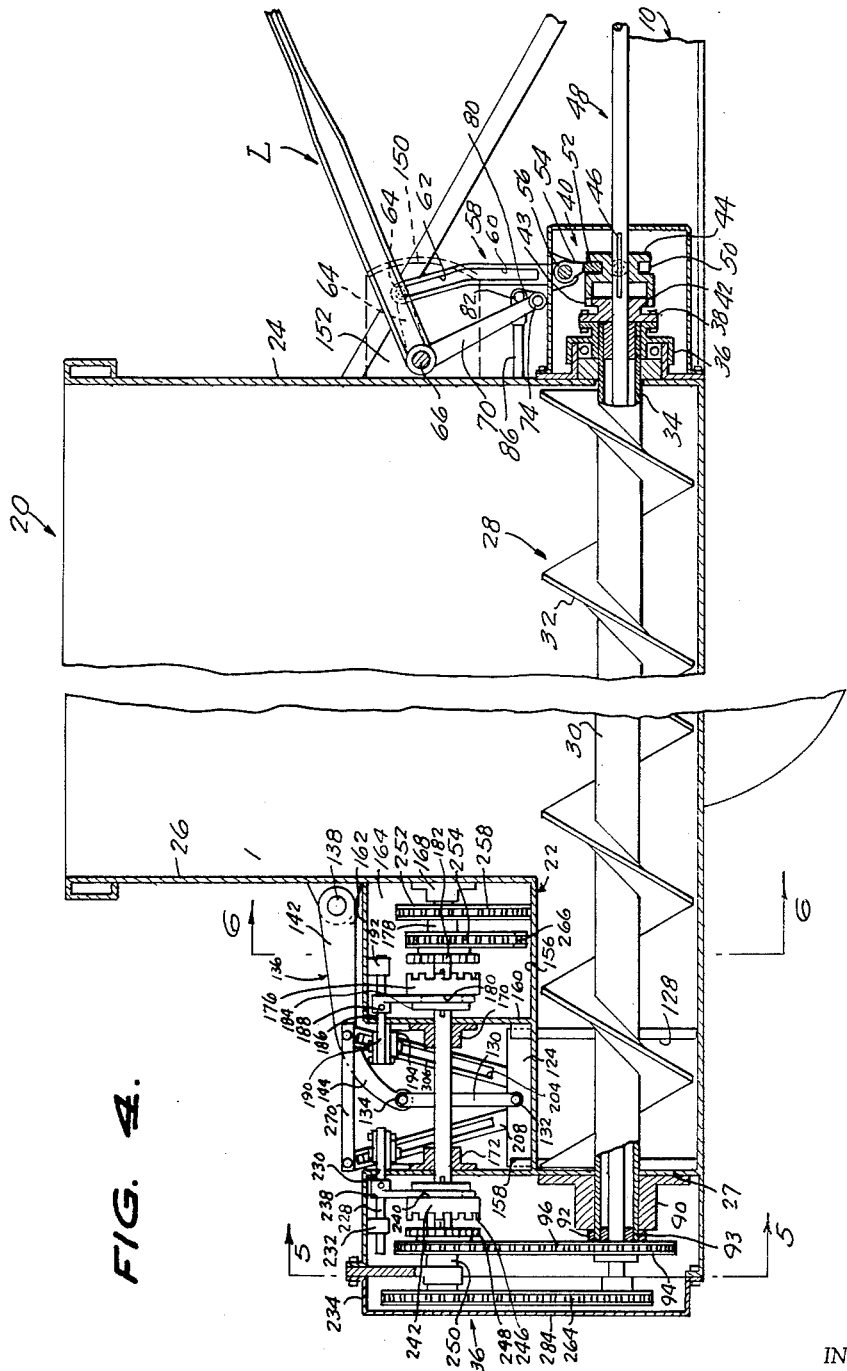
FIGURE 4 is a contracted vertical longitudinal section taken on the line 4—4 of FIGURE 3.

The hopper 20 opens to the upper half of a cylindrical loading conveyor chamber 22. The front vertical wall 24 of the hopper 20 closes the forward end of the chamber 22, as shown in FIGURE 4, and the chamber extends rearwardly beyond the rear vertical wall 26 of the hopper, and is closed by a rear end wall 27. An auger conveyor 28 is concentrically positioned in the chamber 22, and extends the full length thereof.

The auger conveyor 28 comprises a tube 30, on which the auger 32 is fixed, and is longer than the loading chamber 22. The forward end of the tube 30 extends through an opening 34, in the lower part of front wall 24 of the hopper 20, and is journaled through a bearing 36, secured to the outside of the wall 24. The forward end of the tube 30 has secured thereto, as indicated at 38, a stationary clutch member of a clutch 40 comprising a circular toothed disc 42. The teeth of the disc 42 are adapted to be engaged, as shown in FIGURE 4, by the teeth of a toothed ring 43 of a slidable clutch member 44, which is splined, as indicated at 46, on a drive shaft 48 which is connected, as indicated at 49, to the power take-off shaft 18 of the accompanying tractor.

Figure 3:
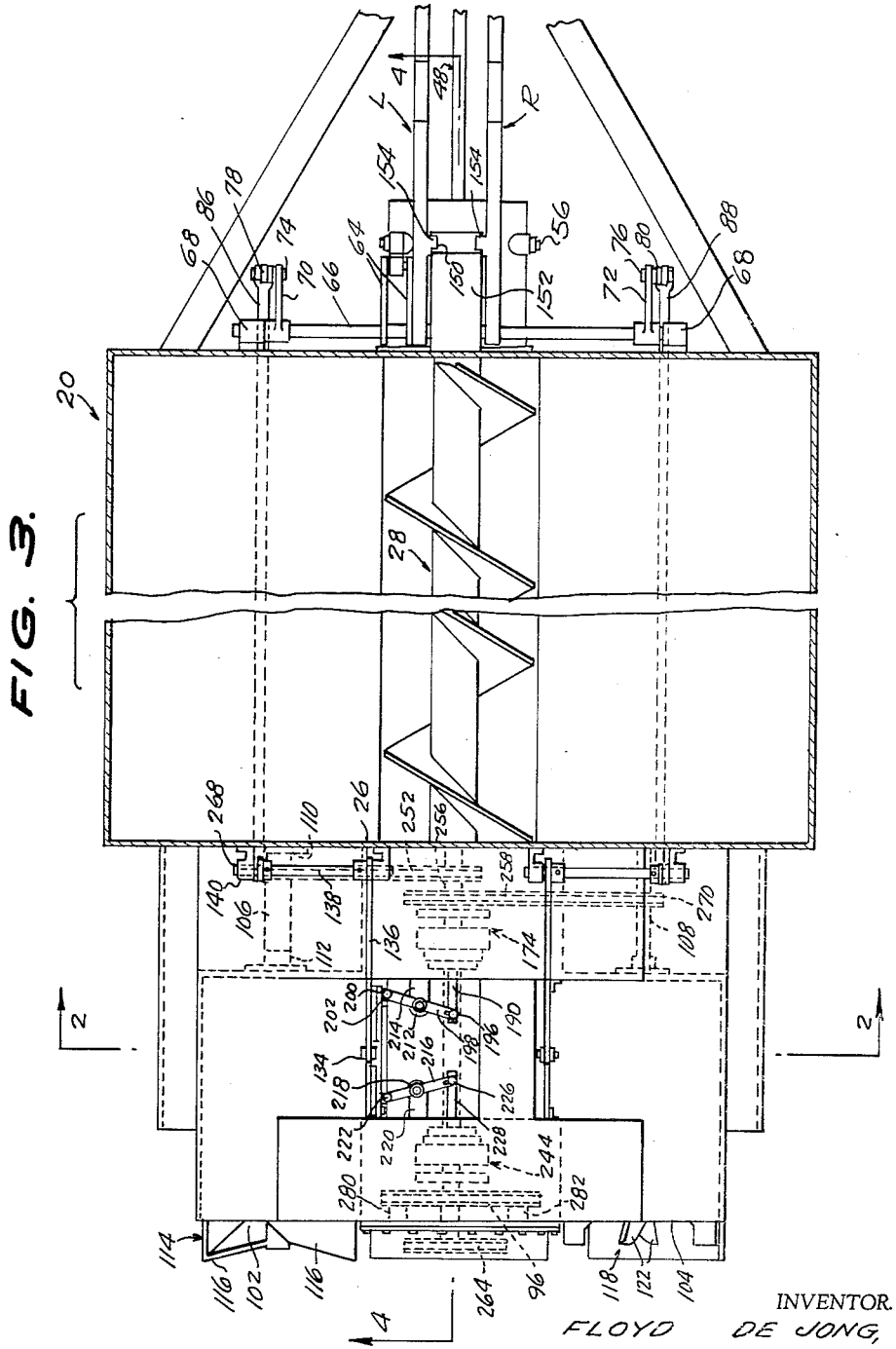
FIGURE 3 is an enlarged contracted horizontal section taken on the line 3—3 of FIGURE 1.

The slidable clutch member 44 has an annular groove 50 in which are engaged the opposed fingers 52 of a clutch fork 54 which is fixed to a supported transverse rotary horizontal clutch shaft 56 which is fixed to the lower end of an upstanding cam lever 58. The lever 58 is formed with a vertically elongated slot which is composed of a perpendicular lower portion 60 and a forwardly inclined upper portion 62. The slot of the lever 58 receives a roller 64 mounted between the forward ends of a pair of short lever arms 64 which are fixed to a horizontal transverse motion transfer shaft 66 which is located close to the front hopper wall 24, between this wall and the lever 58, on a level slightly below the upper end of the lever 58. The shaft 66 is journaled, at its ends, in bearings 68 on the hopper wall 24, as shown in FIGURE 3.

A left-hand shift lever L is fixed to the shaft 66, at the inner side of the pair of lever arms 64, and a right-hand shift lever R is fixed to the shaft 66 and is spaced therefrom to the right. The levers L and R extend rearwardly, and are adapted to be moved above and below the horizontal. Both of the levers L and R are in fixed relationship to downwardly extending lever arms 70 and 72, respectively, which are fixed to the shaft 66, and which are pivoted at their lower ends, as indicated at 74 and 76, to short vertical links 78 and 80, pivoted as indicated at 82, at their upper ends, to the forward ends of left- and right-hand horizontal longitudinal shift rods 86 and 88, respectively. The rods 86 and 88 extend rearwardly along the outsides of the side walls of the hopper 20.

As shown in FIGURE 4, the tube 30 of the loading conveyor 28 is journaled, at its rear end, through a bearing 90 fixed on the rear end wall 27 of the loading chamber 22, and extends rearwardly therefrom and carries a spacer ring 92. The drive shaft 48, which is smaller in diameter than the conveyor tube 30 and is centered therein, extends downwardly out of the tube 30, through a bearing 93, where it carries a relative large diameter sprocket wheel 94, over which a chain 96 is trained. When the clutch 40 is engaged, as shown in FIGURE 4, the auger conveyor 28 turns with the shaft 48.

Extending rearwardly from the hopper 20 on the left-hand and right-hand sides of the loading chamber 22 and having their forward ends closed by the rear wall 26 of the hopper, are semi-cylindrical intake and discharge chambers 98 and 100, having circular open rear ends 102 and 104, respectively. Concentric fan shafts 106 and 108 are mounted in the chambers 98 and 100, respectively, and journaled on front bearings 110 and rear bearings 112, the latter being fixed on the rear hopper wall 26.

Figure 5:
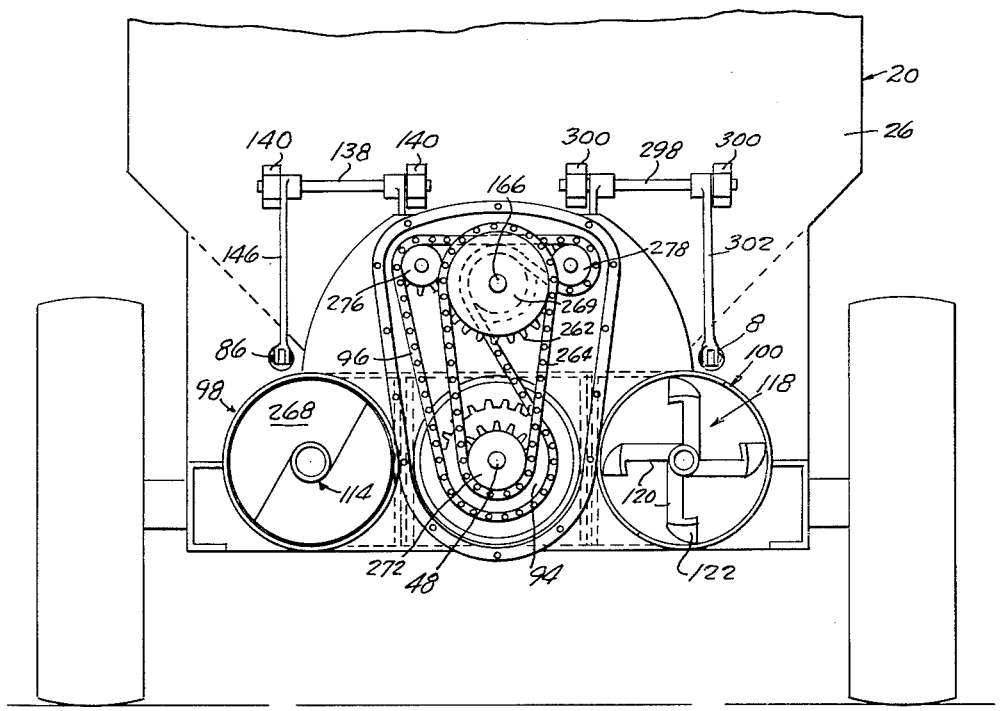
FIGURE 5 is a vertical transverse section taken on the line 5—5 of FIGURE 4.

Fixed on the left-hand shaft 106 is a longitudinally elongated fan 114, which, as indicated in FIGURES 3 and 5, comprise two opposite single auger screws 115, having forwardly convergent rear edges 116, which extend out of the open rear end of the intake chamber 98.

Fixed on the right-hand fan shaft 108 is a discharge fan 118, composed of four equally circumferentially spaced radial canted blades 120, having rearwardly and laterally outwardly angled tips 112, on their outer ends, which extend rearwardly from the open rear end 104 of the discharge chamber 100.

A vertical left-hand vertically slidable gate plate 124 slides in grooves 126 provided on the front and rear edges of the opening 128 which affords sole communication between the intake chamber 98 and the loading chamber 22, at the rear end of the latter. A vertical link 130 is pivotally and centrally connected, at its lower end, as indicated at 132, to the gate plate 124, at its upper edge, and is pivoted, at its upper end, as indicated at 134, to the rear end of a lever 136, which is fixed to and extends rearwardly from a short horizontal transverse left-hand shaft 138, which is journaled in bearings 140 fixed to the rear wall 26 of the hopper 20. The lever 136 has a normally horizontal forward part 142 and a downwardly and rearwardly angled rear part 144. The left-hand shaft 138 is operatively connected to the rear end of the left-hand shift rod 86 by means of a vertical link 146, fixed, at its upper end to the shaft 138, and pivoted, at its lower end, as indicated at 148 to the rod 86. The gate plate 124, shown in depressed closed position, in FIGURE 4, is adapted to be elevated to fully open position, or to any intermediate position, depending upon the rate of transfer of fertilizer desired, between the intake chamber 98 and the loading chamber 22, by moving the left-hand lever L upwardly to various positions, relative to detent notches 150, in the opposite sides of a rearwardly extending plate 152, on the hopper front wall 24, between the left- and right-hand levers L and R, with which are engageable detents 154 on related sides of these levers, for holding adjusted positions thereof.

As shown in FIGURES 2, 3 and 4, a horizontal top wall 156, common to the three chambers 98, 22 and 100, has vertical intermediate and forward walls 158 and 160, respectively, rising therefrom, the rear wall 158 being aligned with the rear wall 27, and the front wall 160 being spaced midway between the rear wall 158 and the rear wall of the hopper 20. A top wall 162 extends between the upper end of the front wall 160 and the hopper rear wall, and between side walls 164 which rise from the top wall 156 over the loading chamber 22. A longitudinal driven shaft 166 is journaled through front, intermediate, and rear bearings 168, 170, and 172, fixed on the hopped rear wall 26, the front wall 156 and the intermediate wall 158, respectively.

A clutch 174 is mounted on the driven shaft 166, between the hopper wall and the front wall 160, and comprises a movable member 176, splined on the shaft 166 and a stationary member 178, fixed on this shaft. The movable clutch member 176 has a ring of forwardly extending teeth 180, adapted to engage between peripheral teeth 182 on the stationary member, for engaging the clutch 174. The movable member 176 has an annular groove 184, in which are engaged the arms of a clutch fork 186. The clutch fork is fixed, as indicated at 188, at its upper end, on a horizontal longitudinal slide shaft 190. At its forward end the slide shaft 190 slides supportably through a bearing 192, on the underside of the top wall 162, and works through an opening 194, in the front wall 160, and is pivoted at its rear end, as indicated at 196, to the right-hand end of a forward horizontal motion transfer lever 198.

The left-hand end of the forward motion transfer lever 198 is pivoted, as indicated at 200, in FIGURES 2 and 3, to a slide 202, which is slidably confined in a longitudinal slot 204, in a forward slideway 206, which is opposed to a rear slideway 208. These slideways are fixed to the gate plate 124 and extend upwardly therefrom at similar divergent angles. The slideways are tied together, at their upper ends, by a cross bar 210. The lever 198 is pivoted, intermediate its ends, as indicated at 212, on a bracket 214 extending rearwardly from the front wall 160. A similar rear motion transfer lever 216 is pivoted intermediate its ends, as indicated at 218, on a bracket 220 extending forwardly from the intermediate wall 158. The left-hand end of the rear lever 216, carries a pivoted slide 222, which is slidably confined in the slot of the rear slideway 208.

The rear motion transfer lever 216 is pivoted, at its right-hand end, as indicated at 226, to the forward end of a rear horizontal longitudinal slide shaft 228, which works through an opening 230, in the intermediate wall 158, and through a bearing 232, fixed to the underside of the top wall 234 of a casing 236, of which the intermediate wall 158 is the front wall. A clutch fork 238 is fixed to and extends downwardly from the slide shaft 228 and its fingers engage in an annular groove 240 in a movable clutch member 242 of a clutch 244. The movable clutch member 242 is splined on the driven shaft 166, within the casing 236 and has a ring of rearwardly extending teeth 246, which are adapted to engage between peripheral teeth 248, on a stationary clutch member 250. The arrangement is such that, as the gate plate 124 is elevated toward open position, the slides 222 and 200 slide upwardly in the slots of the slideways, and in so doing move away from each other, so that the motion transfer levers are pivoted, so as to engage the movable clutch members of both clutches 144 and 174 into engagement with the related stationary clutch members, and thereby connect both stationary clutch members, which otherwise free-wheel on the driven shaft 166, to the drive shaft.

The forward stationary clutch member 178 of the forward clutch 174 includes a relatively large diameter forward sprocket wheel 252 and a smaller diameter rear sprocket wheel 254, over which chains 256 and 258, respectively, are trained. The stationary clutch member 242 of the rear clutch 244 includes a relatively small diameter forward sprocket wheel 260, over which the chain 96 is trained and a larger diameter rear sprocket wheel 262, over which a chain 264 is trained.

Figure 6:
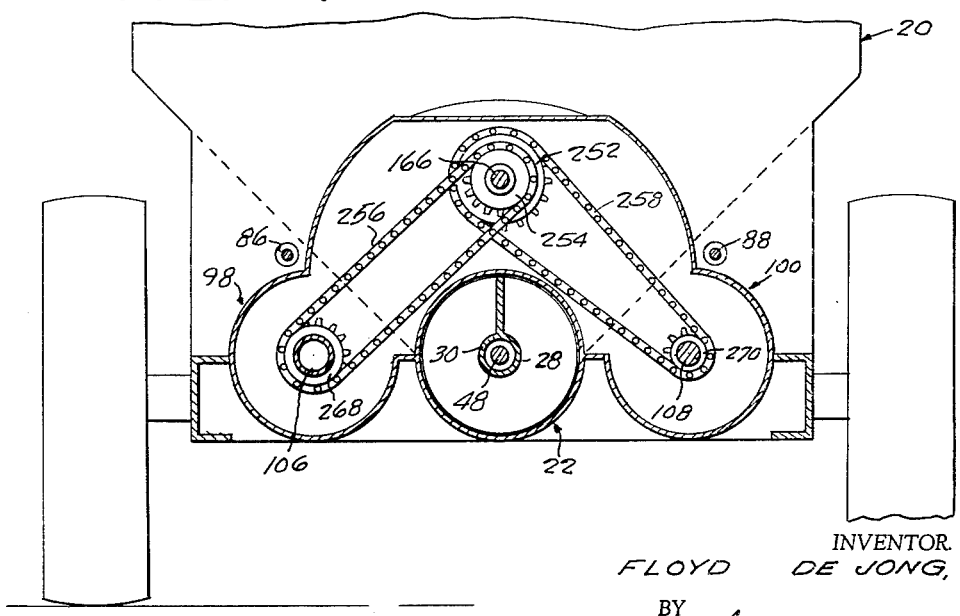
FIGURE 6 is a vertical transverse section taken on the line 6—6 of FIGURE 4.

The forward chain 256 is trained over a sprocket wheel 268 fixed on the intake fan shaft 106, and the chain 258 is trained over a sprocket wheel 20, fixed on the discharge fan shaft 108, as shown in FIGURE 6.

As shown in FIGURES 3, 4 and 6, the chain 264 is trained over a sprocket wheel 272, fixed on the rear end of the drive shaft 48. The chain 96 is trained around the relatively large diameter sprocket wheel 94 which is fixed on the drive shaft 48 and bears against the spacer ring 92. The chain 96 is also trained around left- and right-hand idler sprocket wheels 276 and 278, respectively, which are journaled on brackets 280 and 282, on the rear wall 284 of the casing 236, on a level above the driven shaft and spaced from opposite sides thereof. As shown in FIGURE 5, the chain 96 is trained around the left-hand side of the sprocket wheel 260 on the stationary clutch member of the rear clutch 244, whereby when the rear clutch is engaged, the auger conveyor 28 is driven in a direction to move fertilizer rearwardly out of the hopper 20 and transfer it into the discharge chamber 100 through an opening 286, providing communication between the loading chamber 22 and the discharge chamber 100. Grooves 287 in the front and rear edges of the opening 286 receive the forward and rear edges of a vertically slidable right-hand gate plate 288.

The right-hand gate plate 288 has an upstanding link 290, pivoted as indicated at 292, at its lower end, to the gate plate, at the upper edge thereof, and pivoted, at its upper end, as indicated at 294, to a lever 296, like the left-hand lever 136. The lever 296 is fixed to a relatively short horizontal transverse right-hand shaft 298, journaled in bearings 300, on the hopper rear wall. The shaft 298 is operatively connected to the right-hand shift rod by a pendant lever 302, fixed to the shaft 298, and pivoted, at its lower end, as indicated at 304, to the rod 88.

In operation, the hopper 20 is loaded with fertilizer, from a suitable source, by applying the rear end of the intake chamber 98 to the source, and then with the tractor take-off shaft 18 running, the left-hand shift lever L is elevated, so as to elevate the left-hand gate plate 124 and provide communication between the intake chamber 98 and the loading chamber 22. This engages the forward and rear clutches 174 and 244, respectively, so that the intake fan 114 is operated to draw fertilizer from the source into the rear end of the intake chamber 98 and force it through the opening 128, into the loading chamber 22, while rotating the loading conveyor 28 in a direction to move the fertilizer forwardly and upwardly into and load the hopper 20.

For a fertilizer discharging operation, the left-hand shift lever L is depressed, so as to depress the left-hand gate plate 124 and close the opening 128 between the intake chamber 98 and the loading chamber 22, and at the same time, disengage the clutches 174 and 244. This produces reverse rotation of the loading conveyor 28 and rotation of the discharge fan 118, whereby the loading conveyor draws fertilizer from the hopper and moves it rearwardly. The right-hand shift lever R is then, or at the same time, elevated, so as to elevate the right-hand gate plate 238 to open position. The fertilizer then moves through the opening 286 into the discharge chamber 100 and is sprayed out of the rear end of the discharge chamber, onto the ground, as the spreader travels forwardly, over a field, in a broad and uniform path. The reversal of these manipulations of the shift levers restores the spreader to fertilizer intake and loading operations.

Figure 7:
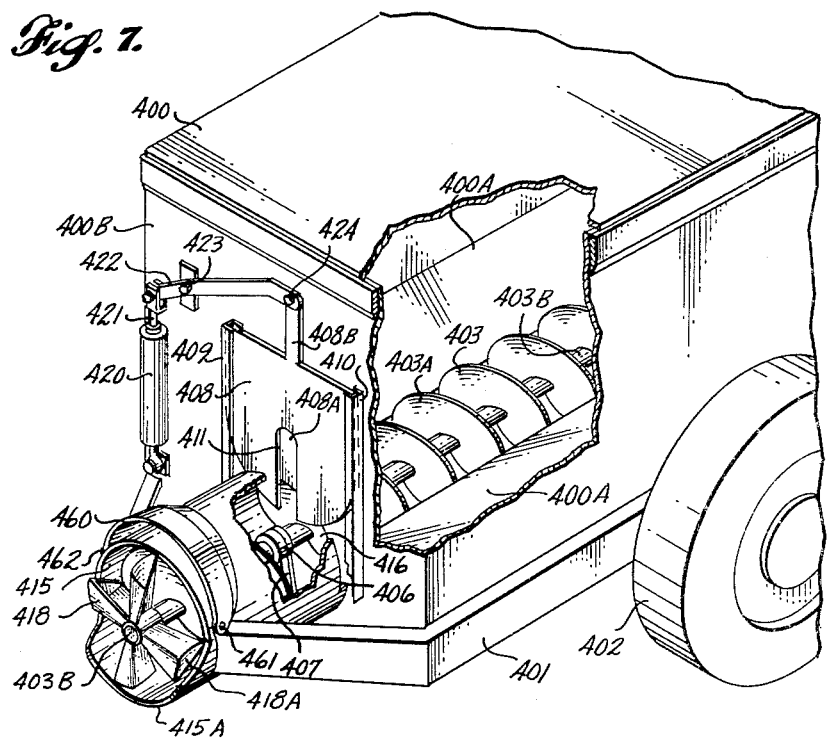
FIGURE 7 is a perspective view from a rear corner of an embodiment of the invention which has a single intake and discharge opening with a portion of the spreader being broken away to show the drive screw on the interior.
Figure 8:
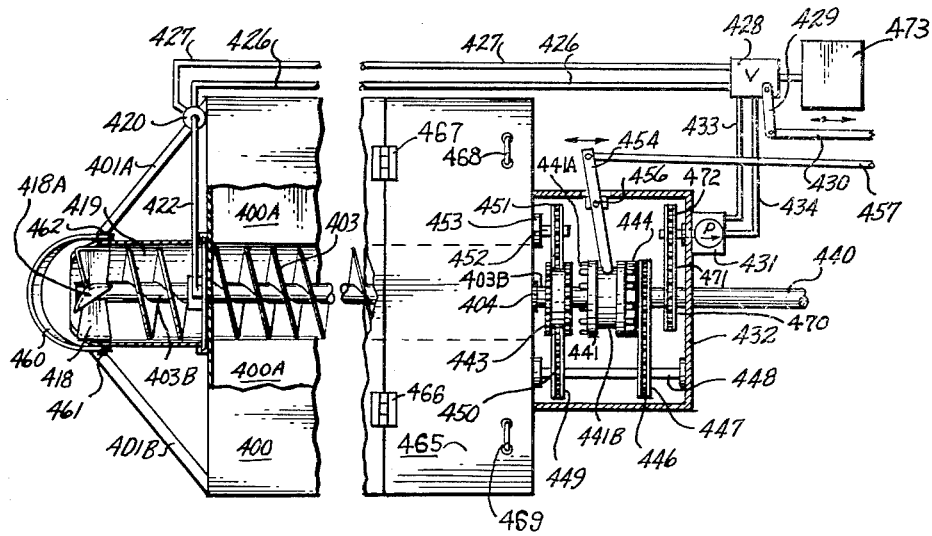
FIGURE 8 is a top view of the embodiment of FIGURE 7 with sections of the housing removed to illustrate the drive apparatus and conveyor more clearly.

A more compact version of the apparatus which makes use of the teachings of the present invention and yet reduces the manufacturing cost is illustrated in FIGURES 7 and 8. Referring now to FIGURE 7, it will be seen that a container or housing in the form of a hopper 400 is secured to a steel frame 401 carried by a suitable axle and transport system such as for example by tires 402 (one of which is illustrated). The axle and support system which carries the frames 401 is preferably such that the frame 401 is maintained close to the ground to facilitate loading of the apparatus in the manner described hereinafter. In the embodiment of the invention illustrated in FIGURE 7 a single helical screw conveyor also known as an auger 403 is positioned for rotation in the lower channeled section of the hopper 400. As in the previous embodiment, the interior walls of the hopper 400 are provided with slanting portions 400A which serve to facilitate flow of the fertilizer or other material to the screw 403 during discharge thereof from the apparatus. The conveyor 403 is of a conventional type readily available on the market and includes the driving blades 403A secured in spiral fashion to a suitable central shaft or tube 403B which is supported at its front end by a suitable bearing 404 on the front vertical wall of the hopper and at its rear end by a suitable bearing 406 supported by a vertical support member 407 extending upwardly from the lower rear section of the hopper. The rear vertical wall 400B of the hopper 400 is provided with a suitable circular opening 416 to permit entrance and discharge of the material to and from the interior of the hopper. A suitable closure member in the form of a sliding gate 408 is positioned within the channeled tracks 409 and 410 welded to the rear vertical wall 400B. The gate 408 has a vertical central slot 408A cut therein to permit upward and downward movement of the gate 408 about the bearing 406 and support 407. The slot 408A is adapted to mate with the vertical support post 407 and the rear bearing 406. A rubber or plastic seal 411 is disposed about the inside edge of the slot 408A to provide a sealing joint between the gate 408 and the vertical support 407 to prevent leakage of fluid around the support 407 when the gate 408 is in its lowered position. It is found that the gate 408 is held tightly against the rear vertical wall by the tracks 409 and 410 so that liquid does not escape during the time that the gate 408 is in its lowered position. A suitable rubber or plastic seal can be disposed between the gate 408 and the rear vertical wall 400B to further insure sealing of the opening in the rear vertical wall 400B when the gate is closed.

A tubular entry and exit conduit in the form of a right circular steel cylinder 415 is welded to the rearwardly extending frame sections 401A and 401B and is also welded along the bottom half of its front edge to the rear vertical wall 400B. Sufficient space is provided between the upper half of the front edge of the conduit 415 and the wall 400B to permit movement of the gate 408 upwardly and downwardly for selective sealing of the opening 416. A four-bladed fan 418 is secured to the rear end of the shaft 403B which forms part of the screw conveyor 403. Each of the fan blades 418 has a web section 418A across the radial extremity thereof forming scoop-like ends which together with the angle of the blades insures that upon rotation of the shaft 403B in one direction (clockwise as seen from the rear) material will be forced into the hopper 400. Rotation of the shaft 403B in the reverse direction will cause discharge of material from the hopper. The fan 418 is preferably located partially within and extending rearwardly from the open end of the conduit 415 and in the preferred embodiment of FIGURE 7 it will be seen that the conduit 415 has a protruding lower edge 415A with the fan blades being disposed to the rear of the upper edge of the end of the conduit and coplanar with the rear edge of the lower portion 415A. This aids upward and outward spraying of material. A short screw conveyor section 419 in the conduit 415 helps move material between the fan and the hopper. Shaft 403B is seen to be part of the conveyor 419. In practice a single piece of screw conveyor material can be used with a portion of the blade removed therefrom at the point where the shaft thereof passes through the wall 400B and to provide a space on the shaft for the support bearing 406 to be assembled.

A hydraulic drive actuator including the cylinder 420 is secured by suitable clamps to the rear wall 400B. A movable piston inside the cylinder is secured to the rod 421 extending through a seal in the top of the cylinder and pinned to the left end of a lever 422 pivoted at 423 on the rear wall 400B. The right end of the lever 422 is pinned at 424 to an upwardly extending projection 408B of the gate 408. The hydraulic actuator including the piston 421 and cylinder 420 is of the type which makes use of a pressurized fluid such as a hydraulic oil to cause positive drive of the piston 421 either upwardly or downwardly to any selected position to thereby permit positive control of the opening and closing of the gate 408. As seen most clearly in FIGURE 8, hydraulic lines 426 and 427 extend from the cylinder 420 to a control valve 428. Valve control means including linkages 429 and 430 permit easy operation and control of the valve by an operator. The control link 430 preferably extends forwardly to a point where an operator on the tow vehicle for the fertilizer spreading apparatus can operate the valve 428 without dismounting from the tow vehicle. A suitable hydraulic pump 431 is carried on the front of the gear housing 432 and provides and receives hydraulic fluid under pressure through the lines 433 and 434 to the valve 428. The hydraulic system thus permits easy control of the opening and closing of the gate 408 and permits positioning of the gate to any desired position intermediate its fully open or completely closed condition.

As previously stated, the embodiment of the invention illustrated in FIGURE 7 makes use of a single impeller and screw conveyor system for loading and unloading and therefore the fan and screw conveyor are adapted for rotation in either of two directions. The drive for the system can be provided by any of a number of conventional systems such as, for example, by an electric motor, diesel or gasoline engine, or by means of a power takeoff system from a tractor or other conventional type of tow vehicle. It is merely necessary that the source of power be adapted to controllably rotate the screw conveyor and fan in one direction or the other. The system can of course be used in a self propelled vehicle, but for purposes of illustration is shown as being in the form of a vehicle to be towed. Therefore in FIGURE 8 a power drive system adapted to be driven by the power takeoff system from a tractor is illustrated as the power source for the screw conveyor and fan. It will be seen in FIGURE 8 that a suitable power drive shaft 400 driven by a tractor or other suitable power source is supported by a bearing in the front wall of a gear housing 432 carried on the front of the hopper 400 and extends into the interior of the gear housing. The chain and gear drive included in the housing 432 is of a conventional type readily available as a unit on the market and as illustrated in FIGURE 8, includes a driving gear 441 splined to the shaft 400 in a manner to permit longitudinal sliding thereof on the shaft 440. Suitable coupling pins 441A extend forwardly and rearwardly from the driving gear 441 so that by controlling the position of the driving gear 441 on the shaft 440 the coupling pins 441A can be engaged with one or the other of the two gears 443 or 444. The gear 443 is directly pinned to the front end of the screw conveyor shaft 403B which extends through the front wall of the hopper 400 and is supported by the bearing 404. The gear 444 is supported by a bearing on the drive shaft 440 so that it is free to rotate freely on the shaft 440. A first drive chain 446 is disposed about the gear 444 and about a gear 447 pinned to the shaft 448 within the gear housing 432. When the gear 447 is driven by the chain 446, it will be seen that a second gear 449 pinned to the shaft 448 will be rotated. A second drive chain 450 passes around the gear 449 and then passes under the gear 443 and then up and around an idler gear 451 carried by a stub shaft 452 supported for rotation by a bearing 453 on the front wall of the hopper 400.

A gear 470 pinned to shaft 440 has a third drive chain 471 engaged therewith with said chain 471 also passing around a gear 472 on the drive shaft of the pump 431. Thus power is provided to the hydraulic pump in response to rotation of shaft 440. An auxiliary fluid supply 473 may be provided in the system.

The main drive gear 441 will be seen to be provided with a central circumferential slot 441B in which the end of a lever 454 pivoted at 456 is located. The lever 454 passes through a suitable opening in the gear housing wall 432 and has a control link 457 pinned thereto, said control link 457 extending forwardly to a position for ready access to the operator of the system. The arrangement is such that when the control link 457 is pushed to its rearmost position, the drive gear 441 is moved forwardly to the position illustrated in FIGURE 8 where it is in engagement with the gear 444 which, as previously described, is free to rotate on the shaft 440. As a result thereof the gear 444 will be driven in the same direction as the shaft 440. Assuming the shaft 440 to be driven counterclockwise as viewed from the front the shaft will therefore be driven counterclockwise. Since the second drive chain 450 passes beneath and is engaged with the underside of the gear 443 pinned to the front end of the screw conveyor shaft 403B, it will be seen that the screw conveyor 403 and fan 418 will be driven clockwise as viewed from the front when the link 457 is pushed rearwardly and shaft 440 is driven counterclockwise. The angle of the blades on the fan 418 is such that the clockwise rotation of the fan 418 will serve to force fertilizer or other material out of the conduit 415. The pitch and sense of spiral of the screw conveyor 403 is such that clockwise rotation thereof serves to force material out of the hopper 400 into the conduit 415. Thus unloading and spreading takes place.

When the gear 441 is moved to its central position, it is disengaged from either of the two gears 443 or 444 and hence no rotation of the screw conveyor and fan takes place even though the drive shaft 440 is rotated. When the link 457 is pulled forwardly to its forwardmost position the gear 441 will be driven rearwardly by the lever 454 and hence will engage the gear 443. As a result thereof the gears 441 and 443 will be locked together so that counter clockwise rotation of the shaft 440 will cause counterclockwise rotation of the conveyor 403 and fan 418. The angle of the blades on the fan 418 and the sense of the spiral on conveyor 403 are such that counterclockwise rotation thereof causes fertilizer or other material to be forced into the hopper 400.

The operation of the embodiment of FIGURES 7 and 8 is as follows: The apparatus is backed into a pit or other suitable loading area so that the open end of the conduit 415 is disposed in the fertilizer or other material to be loaded into the hopper 400. The gate 408 is opened by manipulation of the link 430. The link 457 is then pulled forwardly so that the screw conveyor 403 and fan 418 will be driven counterclockwise (assuming drive shaft 440 is driven counterclockwise). As a result thereof the fan 418, screw conveyor 419, and screw conveyor 402 will drive material into the hopper 400. When a sufficient volume of material has been loaded in the hopper 400, the gate 408 is forced downwardly by the piston 421 in response to actuation of the valve 428 by the operator. The arrangement of the gate 408 with respect to the bearing 406 and support 407 is such that the gate can be closed while the shaft 403B is rotating. An advantage of this construction is that during transit while the gate 408 is closed the screw conveyor 403 can be rotated to stir the mixture. This is of particular value when solid fertilizer such as one of the commercially available types is used and is to be dissolved in water. Since the hopper 400 can be filled with water through the use of the fan and screw conveyor system and then the solid fertilizer added to the hopper while the vehicle is moving to the field to be fertilized the screw conveyor can be driven to insure complete mixing and dissolving of the fertilizer. The solid fertilizer or other material can be loaded into the hopper through the opening provided in the front top by the lid 465 hinged at 466 and 467 to permit access to the interior of the hopper. Handles 468 and 469 are provided for ease of opening the lid 465.

When the vehicle reaches the field the link 457 is moved rearwardly so that the gear 441 is engaged with gear 444 and hence the screw conveyors 403 and 419 as well as the fan 418 are driven in a clockwise direction which will be seen to be the appropriate direction for discharge of the material. The gate 408 is elevated to the extent desired to permit passage of the material from the hopper 400 and the vehicle is then moved across the field. During unloading operations the conveyor 403 within the hopper 400 serves to not only pass material to the fan 418 for the spreading operation but also serves to stir the mixture within the hopper 400 and assure a uniform mixture being applied to the field. In some applications and uses of the apparatus it may be advantageous to have the speed of rotation of the fan during loading different from the speed during unloading. This is readily accomplished merely by changing the relative diameters of the gears 447 and 449 in the gear box. In the embodiment of the invention illustrated in FIGURE 8 the gear 449 is slightly larger than the gear 447 so that the fan 418 is driven faster during unloading than during loading. Other suitable arrangements can be used to thus vary the rotational speed of the shaft 403B including the obvious technique of varying the speed of shaft 440.

An additional advantage of the embodiment of the invention illustrated in FIGURE 7 is that in some applications where the system is being used with a semifluid fertilizer such as manure contained in a pit, the vehicle can be backed into the pit with the open end of the conduit 415 submerged. The fan 418 can then be rotated in a clockwise direction (corresponding to the direction of rotation for unloading) to thereby cause a stirring of the material in the pit prior to the actual loading operation. This makes for a more uniform mixture for subsequent spreading on the fields. After the material in the pit or other loading area is suitably stirred the direction of rotation of the fan and auger system is then reversed to the counterclockwise direction with the loading operation then taking place in the previously described manner.

As seen most clearly in FIGURE 7, a splash guard in the form of a bale 460 is pivoted at 461 and 462 on the rear of conduit 415. During loading operations and also if desired during unloading, the bale 460 is positioned to prevent any undesirable upward flow of the material from the fan 418. The bale 460 is readily adapted to be swung out of the way to its most clockwise position of engagement with the top surface of the conduit 415 should the operator want to use the apparatus for spraying in an upward direction. The bale 460 can similarly be pivoted to its downwardmost position so that if the system is used for spraying fluids, as for example in spraying insecticides or other material in an orchard, the major movement of the material will be upwardly.

As previously stated, the apparatus provided in accordance with the teachings of the present invention is well suited not only for use in loading and spreading raw manure or commercial fertilizers but is also found to be well suited for use with other materials including liquids. It is found that the velocity of the fan 418 is sufficient to discharge the contents of the hopper 400 in a cloud-like spray. Thus a wide area of field can be fertilized by a single pass of the vehicle.

The inventive concepts have been disclosed by reference to specific embodiments, but it will, of course, be obvious to persons skilled in the art that various changes and modifications in the specific embodiments can be made without departing from the scope of the invention. It is therefore intended that such modifications and changes be encompassed within the following claims.

What is claimed is:

1. A self loading and unloading spreader comprising in combination: an enclosed hopper having front and rear walls and including an opening in one of said walls; transport means supporting said hopper for movement over the ground; conduit means connected to said hopper disposed about and extending from said opening and providing a substantially enclosed path for the passage of material to and from said hopper, said conduit means having an outer open end; screw conveyor means disposed in said conduit means; power means coupled with said screw conveyor means for rotating said screw conveyor means in a first direction for forcing material from said conduit means through said opening and into said hopper and in a second direction for forcing material from said hopper and out of said conduit means; and fan means coacting with said screw conveyor means and adjacent the outer end thereof for spreading material forced from said hopper and out of said conduit means.

2. A spreader in accordance with claim 1 wherein: said conduit means includes a member in the shape of a right circular cylinder and wherein said fan means is positioned partially within said member adjacent the open end thereof and extending beyond the upper rear edge of said outer end.

3. A spreader in accordance with claim 2 wherein: said fan means includes a plurality of fan blades each having a webbed section at the outer radial ends thereof to form scoop-like ends thereon.

4. A fertilizer spreader comprising in combination: a wheeled frame; a hopper secured to said frame having a rear wall with an opening in the bottom section thereof; conduit means secured to said wall aligned with and disposed about said opening and extending rearwardly therefrom to provide a substantially enclosed conduit, said conduit means having an open end adapted for positioning in fertilizer material to be loaded into said hopper; fan means positioned in said open end; first screw conveyor means disposed in said conduit means; second screw conveyor means inside said hopper adapted upon rotation in one direction to move material in said hopper toward said opening and upon rotation in the opposite direction to move material away from said opening; gate means selectively positionable to cover said opening; drive means coupled with said fan means and each of said conveyor means; and drive control means coupled with said drive means for controlling the direction of rotation of said second screw means.

5. A fertilizer spreader in accordance with claim 4 wherein said fan means extends rearwardly from a portion of said open end and further including a material deflection member pivoted on said conduit means adjacent the open end thereof.

6. A spreader in accordance with claim 4 wherein said fan means and each of said conveyor means include a common shaft extending through said opening, wherein said drive means is coupled with said shaft and is adapted to rotate said shaft in said one direction for unloading and in said opposite direction for loading, and wherein said conduit means includes a rearwardly extending lower portion with said fan means being positioned above said portion and extending rearwardly with respect to the upper rear end of said conduit means.

7. A spreader in accordance with claim 5 and including: a hydraulic power actuated system connected to said gate means and including hydraulic power control means selectively operable to position said gate means.

8. A fertilizer spreader comprising in combination: a fertilizer hopper having a troughlike bottom section and upwardly slanting walls for facilitating movement of fertilizer in the hopper into said bottom section under the force of gravity and further including a rear wall having an opening aligned with said bottom section; screw conveyor means disposed in said bottom section and extending through said opening with a predetermined length thereof protruding rearwardly from said rear wall; means supporting said conveyor means for rotation; a fan secured to the end of said screw conveyor means adjacent the outer end of said predetermined length thereof; enclosure means disposed about said fan and said predetermined length of conveyor means and having an open end immediately adjacent to said fan to permit entry and exit of material; drive means coupled with said screw conveyor means and selectively operable to rotate said screw conveyor means in a first direction during loading and in a second direction during unloading; and means supporting said hopper for movement over the ground.

9. A spreader in accordance with claim 8 and including an arcuate deflecting bail member secured to said enclosure means adjacent said open end and adapted to be positioned over a part of said open end to prevent spraying of material by said fan during loading and to partially direct the spraying of material by said fan during unloading.

10. A fertilizer spreader comprising a fertilizer hopper, a loading chamber extending lengthwise of the hopper and in communication therewith, said chamber having closed forward and rear ends, a loading auger conveyor journaled in said chamber, intake and discharge chamber on opposite sides of the loading chamber and containing intake and discharge fans, respectively, said intake and discharge chambers having open rear ends, means providing selective communication between the intake chamber and the loading chamber and between the loading chamber and the discharge chamber at different times, means for rotating the auger conveyor selectively in opposite directions, at different times, means for selectively rotating the intake and discharge fans, at different times.

11. A fertilizer spreader comprising a wheeled frame having a drawbar on its forward end adapted to be connected to a tractor, a hopper mounted on the frame, said hopper having a V-shaped bottom wall and front and rear walls, a longitudinal loading chamber beneath the hopper and extending rearwardly beyond the hopper, means providing free communication between the apex of the hopper bottom wall and the top of the loading chamber, a loading auger conveyor centered in and extending the length of the loading chamber, said chamber having a rear wall, said auger conveyor comprising a tube supportably journaled through the hopper front wall and the rear wall of the chamber, a drive shaft extending spacedly through the conveyor tube and journaled therein, a fixed clutch member on the forward end of the tube, a movable clutch member splined on the drive shaft in front of and adapted to be engaged with the fixed clutch member, a first shift lever pivotally supported in front of the hopper and operatively connected to the movable clutch member, a second shift lever pivotally supported in front of the hopper, a first longitudinal shift rod operatively connected to the first shift lever and extending rearwardly along one side of the hopper, a second longitudinal shift rod connected to the second shift lever and extending rearwardly along the other side of the hopper, a longitudinal intake chamber along one side of the loading chamber and having an open rear intake end and a closed forward end, a longitudinal discharge chamber along the other side of the loading chamber and having an open rear discharge end and a closed forward end, a rotary intake fan mounted in the intake chamber, a rotary discharge fan mounted in the discharge chamber, walls separating the intake and discharge chamber from the loading chamber, said walls being formed with first and second openings providing communication, at times, between the intake chambers and the loading chamber and between the loading chamber and the discharge chamber, respectively, first and second vertically slidable gate plates mounted to close said first and second openings, first means operatively connecting the first gate plate with the first shift rod, second means operatively connecting the second gate plate with the second shift rod.

12. A fertilizer spreader comprising a wheeled frame having a drawbar on its forward end adapted to be connected to a tractor, a hopper mounted on the frame, said hopper having a V-shaped bottom wall and front and rear walls, a longitudinal loading chamber beneath the hopper and extending rearwardly beyond the hopper, means providing free communication between the apex of the hopper bottom wall and the top of the loading chamber, a loading auger conveyor centered in and extending the length of the loading chamber, said chamber having a rear wall, said auger conveyor comprising a tube supportably journaled through the hopper front wall and the rear wall of the chamber, a drive shaft extending spacedly through the conveyor tube and journaled therein, a fixed clutch member on the forward end of the tube, a movable clutch member splined on the drive shaft in front of and adapted to be engaged with the fixed clutch member, a first shift lever pivotally supported in front of the hopper and operatively connected to the movable clutch member, a second shift lever pivotally supported in front of the hopper, a first longitudinal shift rod operatively connected to the first shift lever and extending rearwardly along one side of the hopper, a second longitudinal shift rod connected to the second shift lever and extending rearwardly along the other side of the hopper, a longitudinal intake chamber along one side of the loading chamber and having an open rear intake end and a closed forward end, a longitudinal discharge chamber along the other side of the loading chamber and having an open rear discharge end and a closed forward end, a rotary intake fan mounted in the intake chamber, a rotary discharge fan mounted in the discharge chamber, walls separating the intake and discharge chamber from the loading chamber, said walls being formed with first and second openings providing communications, at times, between the intake chamber and the loading chamber and between the loading chamber and the discharge chamber, respectively, first and second vertically slidable gate plates mounted to close said first and second openings, first means operatively connecting the first gate plate with the first shift rod, second means operatively connecting the second gate plate with the second shift rod, said first connecting means comprising a first lever pivotally supported behind the hopper and extending rearwardly therefrom, said first gate plate having an upstanding lever pivoted thereto and pivoted to the rear end of the first lever.

13. A fertilizer spreader comprising a wheeled frame having a drawbar on its forward end adapted to be connected to a tractor, a hopper mounted on the frame, said hopper having a V-shaped bottom wall and front and rear walls, a longitudinal loading chamber beneath the hopper and extending rearwardly beyond the hopper, means providing free communication between the apex of the hopper bottom wall and the top of the loading chamber, a loading auger conveyor centered in and extending the length of the loading chamber, said chamber having a rear wall, said auger conveyor comprising a tube supportedly journaled through the hopper front wall and the rear wall of the chamber, a drive shaft extending spacedly through the conveyor tube and journaled therein a fixed clutch member on the forward end of the tube, a movable clutch member splined on the drive shaft in front of and adapted to be engaged with the fixed clutch member, a first shift lever pivotally supported in front of the hopper and operatively connected to the movable clutch member, a second shift lever pivotally supported in front of the hopper, a first longitudinal shift rod operatively connected to the first shift lever and extending rearwardly along one side of the hopper, a second longitudinal shift rod connected to the second shift lever extending rearwardly along the other side of the hopper, a longitudinal intake chamber along one side of the loading chamber and having an open rear intake end and a closed forward end, a longitudinal discharge chamber along the other side of the loading chamber and having an open rear discharge end and a closed forward end, a rotary intake fan mounted in the intake chamber, a rotary discharge fan mounted in the discharge chamber, walls separating the intake and discharge chambers from the loading chamber, said walls being formed with first and second openings providing communications, at times, between the intake chamber and the loading chamber and between the loading chamber and the discharge chamber, respectively, first and second vertically slidably gate plates mounted to close said first and second openings, first means operatively connecting the first gate plate with the first shift rod, second means operatively connecting the second gate plate with the second shift rod, said first connecting means comprising a first lever pivotally supported behind the hopper and extending rearwardly therefrom, said first gate plate having an upstanding lever pivoted thereto and pivoted to the rear end of the first lever, a longitudinal driven shaft rotatably supported behind the hopper, said driven shaft having spaced forward and rear clutches mounted thereon, each of said clutches having a movable member splined on the driven shaft and a stationary member free to rotate on the driven shaft, the stationary members of the front clutch being operatively connected to the intake fan and the discharge fan, said first lever being operatively connected to the movable members of both clutches for simultaneously engaging the front and rear clutches as the first shift lever is pivoted in one direction, the stationary member of the rear clutch being operatively connected to the drive shaft for rotating the driven shaft in one direction while the clutches are disengaged, the tube of the loading conveyor being operatively connected to the stationary member of the rear clutch for rotating the loading auger in the opposite direction while the clutches are engaged.

14. A fertilizer spreader comprising a wheeled frame having a drawbar on its forward end adapted to be connected to a tractor, a hopper mounted on the frame, said hopper having a V-shaped bottom wall and front and rear walls, a longitudinal loading chamber beneath the hopper and extending rearwardly beyond the hopper, means providing free communication between the apex of the hopper bottom wall and the top of the loading chamber, a loading auger conveyor centered in and extending the length of the loading chamber, said chamber having a rear wall, said auger conveyor comprising a tube supportably journaled through the hopper front wall and the rear wall of the chamber, a drive shaft extending spacedly through the conveyor tube and journaled therein, a fixed clutch member on the forward end of the tube, a movable clutch member splined on the drive shaft in front of and adapted to be engaged with the fixed clutch member, a first shift lever pivotally supported in front of the hopper and operatively connected to the movable clutch member, a second shift lever pivotally supported in front of the hopper, a first longitudinal shift rod operatively connected to the first shift lever and extending rearwardly along one side of the hopper, a second longitudinal shift rod connected to the second shift lever and extending rearwardly along the other side of the hopper, a longitudinal intake chamber along one side of the loading chamber and having an open rear intake end and a closed forward end, a longitudinal discharge chamber along the other side of the loading chamber and having an open rear discharge end and a closed forward end, a rotary intake fan mounted in the intake chamber, a rotary discharge fan mounted in the discharge chamber, walls separating the intake and discharge chambers from the loading chamber, said walls being formed with first and second openings providing communications, at times, between the intake chamber and the loading chamber and between the loading chamber and the discharge chamber, respectively, first and second vertically slidable gate plates mounted to close said first and second openings, first means operatively connecting the first gate plate with the first shift rod, second means operatively connecting the second gate plate with the second shift rod, said first connecting means comprising a first lever pivotally supported behind the hopper and extending rearwardly therefrom, said first gate plate having an upstanding lever pivoted thereto and pivoted to the rear end of the first lever, a longitudinal driven shaft rotatably supported behind the hopper, said driven shaft having spaced forward and rear clutches mounted thereon, each of said clutches having a movable member splined on the driven shaft and a stationary member free to rotate on the driven shaft, the stationary members of the front clutch being operatively connected to the intake fan and the discharge fan, said first lever being operatively connected to the movable members of both clutches for simultaneously engaging the forward and rear clutches as the first shift lever is pivoted in one direction, the stationary member of the rear clutch being operatively connected to the drive shaft for rotating the driven shaft in one direction while the clutches are disengaged, the tube of the loading conveyor being operatively connected to the stationary member of the rear clutch for rotating the loading auger in the opposite direction while the clutches are engaged, said first connecting means comprising upwardly divergent slideways on the first gate plate, front and rear horizontal motion transfer levers pivotally supported intermediate their ends between the front and rear clutches, front and rear slide shafts slidably supported relative to the front and rear clutches and having clutch forks operatively engaged with their movable members, said motion transfer levers having slides on one end thereof slidably engaged with related slideways and being pivoted at their other ends to related ones of the slide shafts.

15. A fertilizer spreader comprising in combination: a wheeled frame; a hopper carried by said frame and adapted to hold material to be spread, said hopper having a rear wall and a bottom and including an opening in said rear wall adjacent to said bottom; conduit means disposed about and extending from said opening to provide a substantially enclosed path for the passage of material to and from said hopper, said conduit means having an outer open end adapted to be positioned in material to be loaded in said hopper; first screw conveyor means supported for rotation within said conduit means adapted upon rotation in a first direction to force material into said hopper; power means coupled with and adapted to rotate said screw conveyor means in said first direction; and discharge means including fan means disposed adjacent said outer open end adapted to discharge material from said hopper during movement thereof over the ground.

16. A fertilizer spreader in accordance with claim 15 wherein said discharge means includes said first screw conveyor means and further includes means adapted to rotate said first screw conveyor means in a second direction opposite to said first direction.

17. A fertilizer spreader in accordance with claim 16 wherein said fan means includes a fan supported for rotation in said outer open end of said conduit means.

18. A fertilizer spreader in accordance with claim 17 wherein said fan includes a plurality of blades secured to said first screw conveyor.

19. A fertilizer spreader comprising in combination: a wheeled frame; a hopper carried by said frame and adapted to hold material to be spread; conduit means communicating with the interior of and extending from said hopper and having an opening therein adapted to be positioned in material to be loaded in said hopper; first screw conveyor means supported for rotation within said conduit means adapted upon rotation in a first direction to force material into said hopper; power means coupled with and adapted to rotate said screw conveyor means in said first direction; and discharge means comprising second conduit means communicating with the interior of and extending from said hopper and having a discharge opening, a rotary impeller supported for rotation in said discharge opening and adapted upon rotation to discharge material therefrom, second conveyor means within said second conduit means adapted to convey material from said hopper to said rotary impeller, and drive means adapted to operate said impeller and said second conveyor means; said discharge means being adapted to discharge material from said hopper during movement thereof over the ground.

References Cited by the Examiner

UNITED STATES PATENTS

| | | | |
|---|---|---|---|
| 185,083 | 12/76 | Diltz | 275—2 |
| 1,614,870 | 1/27 | Bruce | 275—1 |
| 2,343,714 | 3/44 | Swenson | 275—1 |
| 2,401,465 | 6/46 | Cwicig | 275—2 |
| 3,121,568 | 2/64 | Wilkes et al. | 172—45 X |

ABRAHAM G. STONE, *Primary Examiner.*

WILLIAM A. SMITH III, *Examiner.*

UNITED STATES PATENT OFFICE
CERTIFICATE OF CORRECTION

Patent No. 3,206,215                            September 14, 1965
Floyd De Jong, deceased, by
Ina Mae De Jong, administratrix It is hereby certified that error appears in the above numbered patent requiring correction and that the said Letters Patent should read as corrected below.

Column 11, line 66, for "chamber", second occurrence, read -- chambers --; column 12, line 33, for "chamber" read -- chambers --; column 13, line 27, for "therein" read -- therein, --; line 37, for "lever extending" read -- lever and extending --.

Signed and sealed this 10th day of May 1966.

(SEAL)
Attest:

ERNEST W. SWIDER                            EDWARD J. BRENNER
Attesting Officer                                Commissioner of Patents